United States Patent
Jiang et al.

(10) Patent No.: US 11,628,858 B2
(45) Date of Patent: Apr. 18, 2023

(54) HYBRID PLANNING SYSTEM FOR AUTONOMOUS VEHICLES

(71) Applicant: Baidu USA LLC, Sunnyvale, CA (US)

(72) Inventors: Yifei Jiang, Sunnyvale, CA (US); Jinyun Zhou, Sunnyvale, CA (US); Jiaming Tao, Sunnyvale, CA (US); Shu Jiang, Sunnyvale, CA (US); Jiangtao Hu, Sunnyvale, CA (US); Jinghao Miao, Sunnyvale, CA (US); Shiyu Song, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 141 days.

(21) Appl. No.: 17/021,207

(22) Filed: Sep. 15, 2020

(65) Prior Publication Data
US 2022/0081000 A1    Mar. 17, 2022

(51) Int. Cl.
*B60W 60/00* (2020.01)
*G01C 21/00* (2006.01)
*B60W 30/095* (2012.01)
*B60W 30/18* (2012.01)
*G01C 21/34* (2006.01)
*G06N 3/08* (2023.01)

(52) U.S. Cl.
CPC .... *B60W 60/0011* (2020.02); *B60W 30/0956* (2013.01); *B60W 30/18163* (2013.01); *B60W 60/0013* (2020.02); *B60W 60/0015* (2020.02); *G01C 21/3453* (2013.01); *G01C 21/3885* (2020.08); *G06N 3/08* (2013.01); *B60W 2552/53* (2020.02); *B60W 2555/60* (2020.02)

(58) Field of Classification Search
None
See application file for complete search history.

(56) References Cited

U.S. PATENT DOCUMENTS

| | | | |
|---|---|---|---|
| 2018/0251126 A1* | 9/2018 | Linscott | G01C 21/3407 |
| 2019/0079523 A1* | 3/2019 | Zhu | B60W 30/10 |
| 2019/0079528 A1* | 3/2019 | Zhu | B60W 30/095 |
| 2019/0384309 A1* | 12/2019 | Silva | G01S 17/931 |
| 2020/0225669 A1* | 7/2020 | Silva | B60W 60/0011 |
| 2020/0241541 A1* | 7/2020 | McCawley | B60W 30/16 |
| 2021/0046923 A1* | 2/2021 | Olson | G05D 1/0088 |

(Continued)

*Primary Examiner* — Ryan Rink
(74) *Attorney, Agent, or Firm* — Womble Bond Dickinson (US) LLP

(57) ABSTRACT

In one embodiment, a system/method generates a driving trajectory for an autonomous driving vehicle (ADV). The system perceives an environment of an autonomous driving vehicle (ADV). The system determines one or more bounding conditions based on the perceived environment. The system generates a first trajectory using a neural network model, wherein the neural network model is trained to generate a driving trajectory. The system evaluates/determines if the first trajectory satisfies the one or more bounding conditions. If the first trajectory satisfies the one or more bounding conditions, the system controls the ADV autonomously according to the first trajectory. Otherwise, the system controls the ADV autonomously according to a second trajectory, where the second trajectory is generated based on an objective function, where the objective function is determined based on at least the one or more bounding conditions.

21 Claims, 13 Drawing Sheets

(56) References Cited

U.S. PATENT DOCUMENTS

| | | | |
|---|---|---|---|
| 2021/0271251 A1* | 9/2021 | Hudecek | G05D 1/0217 |
| 2021/0339741 A1* | 11/2021 | Rezvan Behbahani | ................... |
| | | | B60W 30/0956 |
| 2021/0370921 A1* | 12/2021 | Silva | B60W 60/0016 |
| 2021/0380099 A1* | 12/2021 | Lee | B60W 30/18163 |
| 2022/0219727 A1* | 7/2022 | Floor | B60W 60/0011 |

* cited by examiner

HYBRID PLANNING SYSTEM FOR AUTONOMOUS VEHICLES

TECHNICAL FIELD

Embodiments of the present disclosure relate generally to operating autonomous driving vehicles. More particularly, embodiments of the disclosure relate to a hybrid planning system for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

The goal of autonomous driving planning is to generate a trajectory that the vehicle can follow. An ADV can self-navigate using a driving trajectory. A driving trajectory can determine a place, a speed, and acceleration for the ADV at a given point in time. Thus, the driving trajectory generation is a critical component for a semi or fully-autonomous driving vehicle.

The generated trajectory needs to balance at least three criteria, the criteria being safety of onboard passengers and/or nearby pedestrians, comfort of onboard passengers, and an objective in making progress towards a destination location. To be safe, the trajectory needs to avoid obstacles in the surrounding environment. For comfort, the trajectory needs to be a smooth and efficient trajectory, i.e., with graceful accelerations which can maneuver an ADV from a current location to a destination within a reasonable time. Lastly, the trajectories need to follow local traffic rules, i.e., stop at red signal lights and stop signs, etc.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
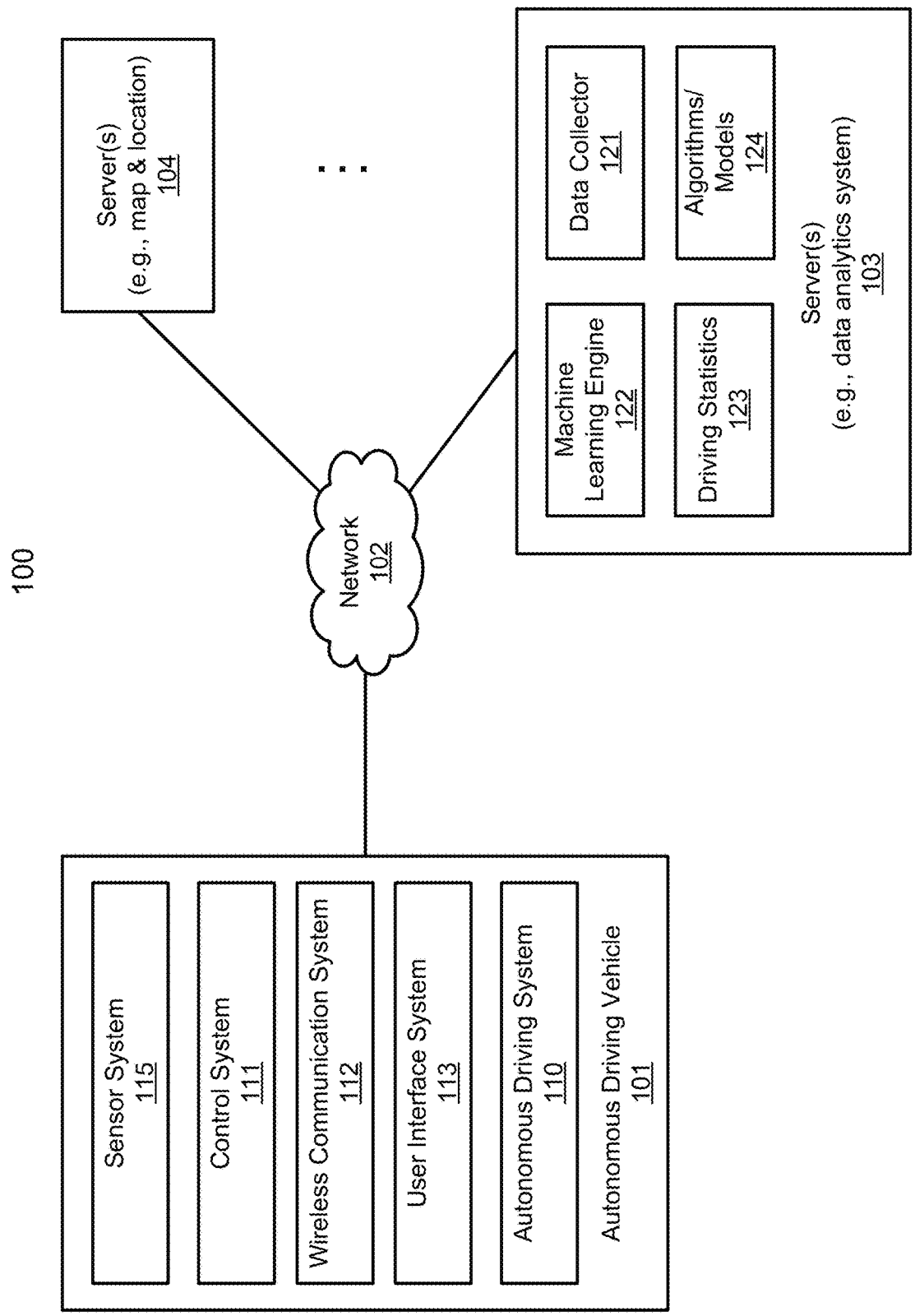
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments of the disclosure combine two prominent types of planning systems. A planning system may be a rule-based planning system (using an objective function), which can ensure a certain level of operator safety, comfort/smoothness for generated trajectories, and the trajectories achieve a reasonable progress. However, the rule-based planning system may fail to prioritize the three criteria under some scenarios. For example, when a vehicle cut in front of an ADV, the ADV may apply a hard break in order to guarantee a safe distance (e.g., 3 seconds to the car that cut in the front). Another planning system may be a deep learning neural network model-based planning system, which may be trained to generate a trajectory having a balance of the three criteria. But for some scenarios, the model may output unsafe trajectories.

According to some embodiments, a system/method generates a driving trajectory for an autonomous driving vehicle (ADV). The system perceives an environment of an autonomous driving vehicle (ADV). The system determines one or more bounding conditions based on the perceived environment. In one embodiment, the bounding conditions may be further determined based on traffic rules and/or map information. For example, the map information specifies a lane of the ADV, the left and right lane boundaries, a direction of traffic for the lane, and whether a lane change is allowed according to traffic rules (e.g., dotted lane makers or a solid lane line). The map information may be a high definition map (e.g., map and route data 311 of FIG. 3A) of the ADV, or a map generated in real-time as perceived from sensors of the ADV. The traffic rules can specify a red traffic light is a stop, and a green traffic light is a go. Based on the traffic rules and/or map information, the bounding conditions can be specified for the ADV, in real-time. The system generates a first trajectory using a neural network model, wherein the neural network model is trained to generate a driving trajectory. The system evaluates/determines if the first trajectory satisfies the one or more bounding conditions. If the first trajectory satisfies the one or more bounding conditions, the system controls the ADV autonomously according to the first trajectory. Otherwise, the system controls the ADV autonomously according to a second trajectory, where the second trajectory is generated based on an objective function, where the objective function is determined based on at least the one or more bounding conditions.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
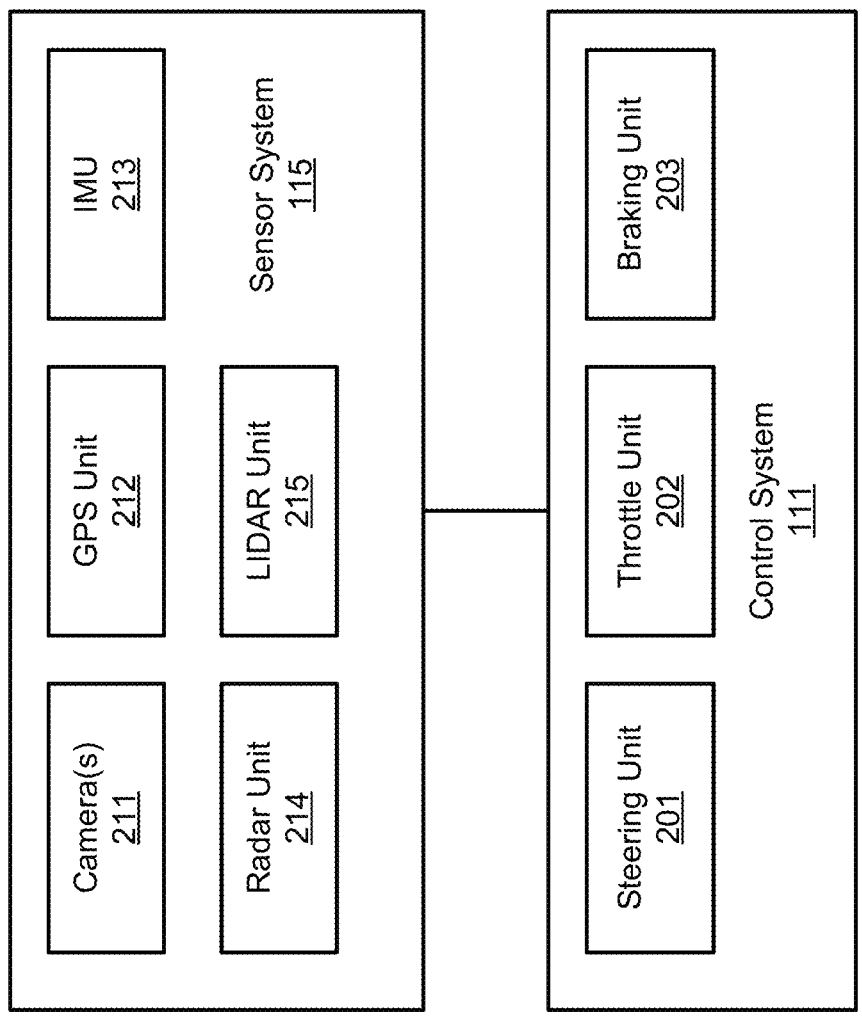
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include a neural network (NN) model that can generate a driving trajectory based on a dynamic of the ADV (such as the braking and acceleration capabilities of the ADV), map information, traffic rules, and/or a perceived environment for the ADV. In one embodiment, algorithms 124 include a rule-based model that can generate a driving trajectory that can substitute for the NN model driving trajectory. IN one embodiment, algorithm 124 includes the process logics to select a driving trajectory to control the ADV. Algorithms 124 can then be uploaded on ADVs to be utilized during autonomous driving in real-time.

Figure 3A:
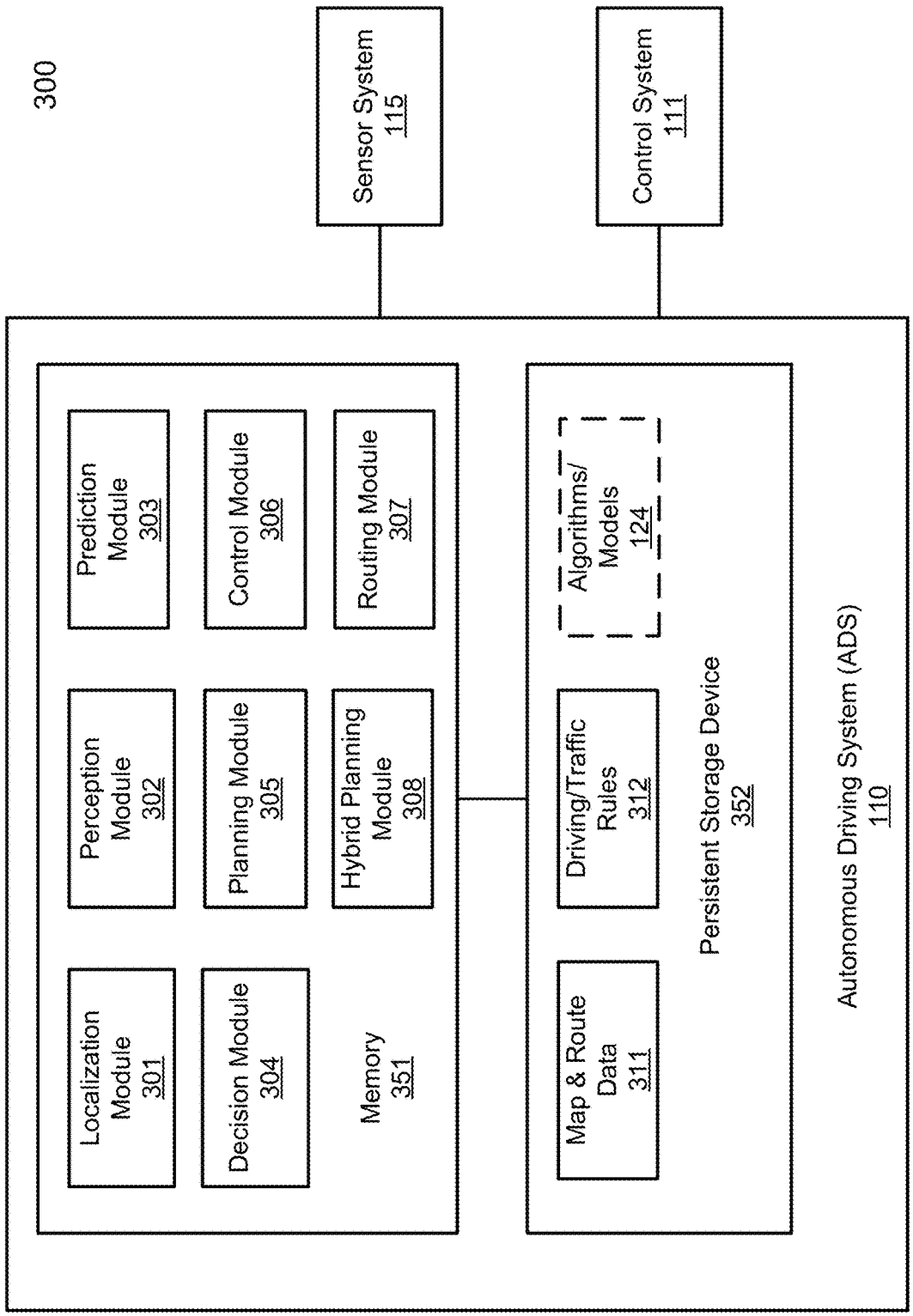
FIGS. 3A-3B are block diagrams illustrating an example of an autonomous driving system used with an autonomous driving vehicle according to one embodiment.
Figure 3B:
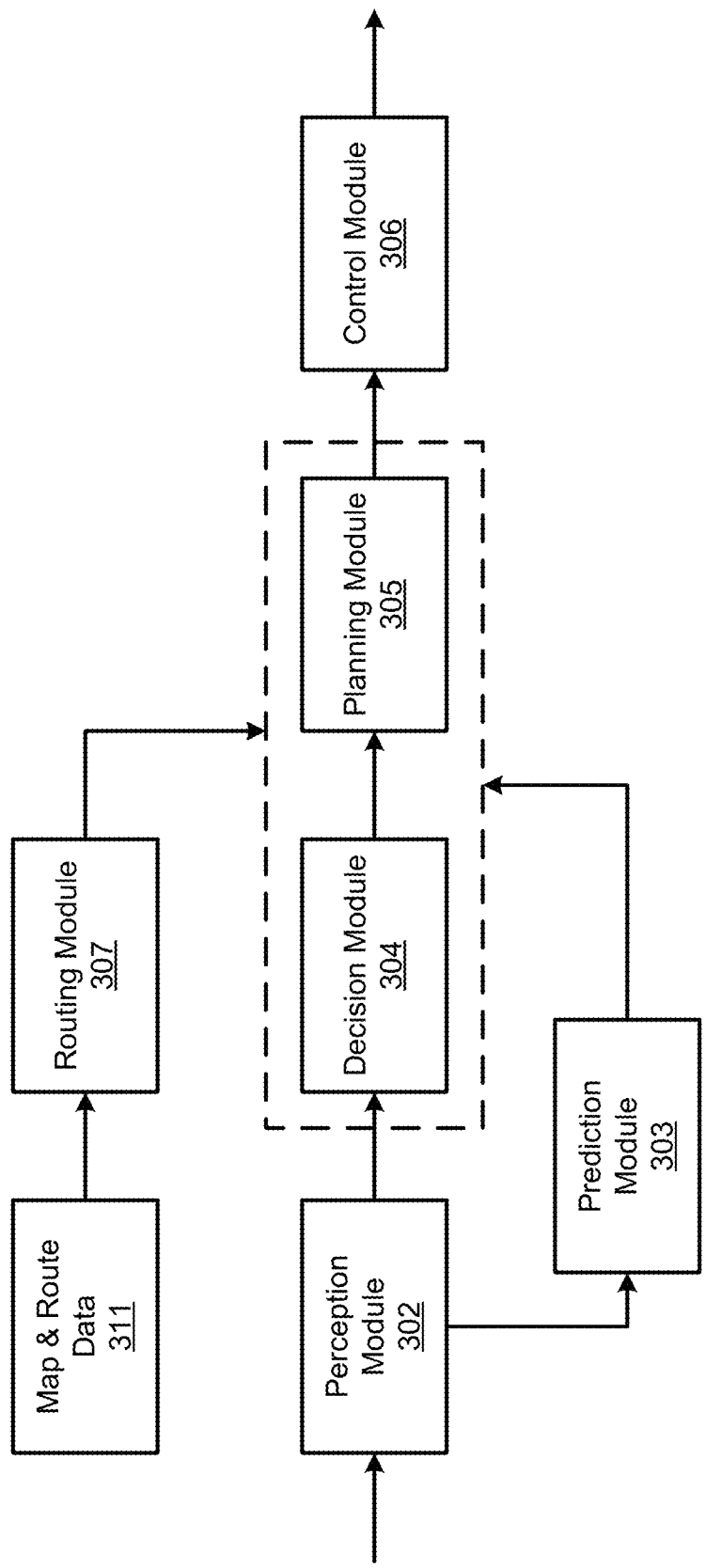

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and hybrid planning module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map and route data 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point.

For a given trip from a start location to a destination location, for example, received from a user, routing module 307 obtains map and route data 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
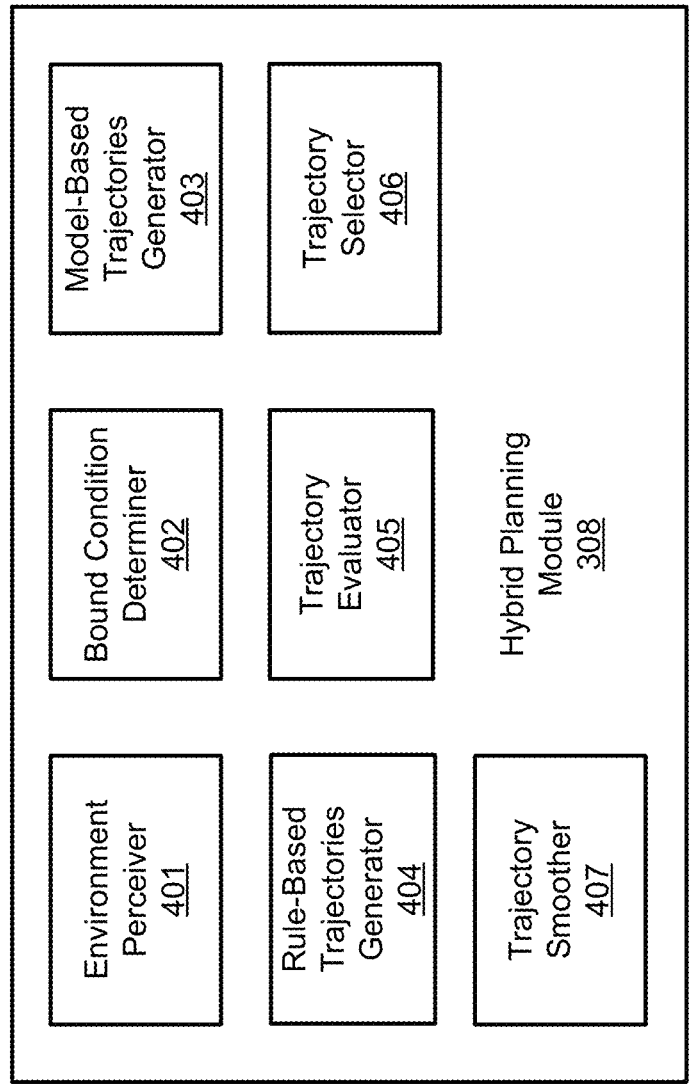
FIG. 4 is a block diagram illustrating an example of a hybrid planning module according to one embodiment.

FIG. 4 is a block diagram illustrating an example of a hybrid planning module according to one embodiment. Hybrid planning module 308 may be implemented as part of planning module 305 of FIG. 3A. Hybrid planning module 308 can generate a trajectory using either a model-based approach or a rule-based approached to control an ADV. The selection criteria for the trajectory can be based on one or more bounding conditions applied to the trajectory. Referring to FIG. 4, in one embodiment, hybrid planning module 308 may include submodules such as environment perceiver 401, bound condition determiner 402, model-based trajectories generator 403, rule-based trajectories generator 404, trajectory evaluator 405, trajectory selector 406, and trajectory smoother 407.

Environment perceiver 401 can perceive an environment surrounding the ADV using sensors of the ADV. The perceived environment can include static obstacles (buildings/landmarks) and dynamic obstacles (pedestrians/vehicles). Bound condition determiner 402 can identify one or more bounding conditions for an ADV. Examples of bounding conditions can include obstacle bounds, traffic light bounds, yield/overtake bounds, road/lane bounds. Here, the bound conditions may be artificially formed bounds determined based on a planning decision (e.g., to yield or to overtake a vehicle). Model-based trajectories generator 403 can generate a trajectory using a deep learning neural network (NN) model. Rule-based trajectories generator 404 can generate a trajectory using a rule-based approach, such as, using an objective function or weighted function based on factors of safety, comfort, and/or making progress, etc. Trajectory evaluator 405 can evaluate if a generated trajectory satisfies or violates the one or more bounding conditions. Trajectory selector 406 can select a trajectory to control an ADV. Trajectory smoother 407 can apply a smoothing function (such as B-spline or regression, etc.) to the selected trajectory.

Figure 5:
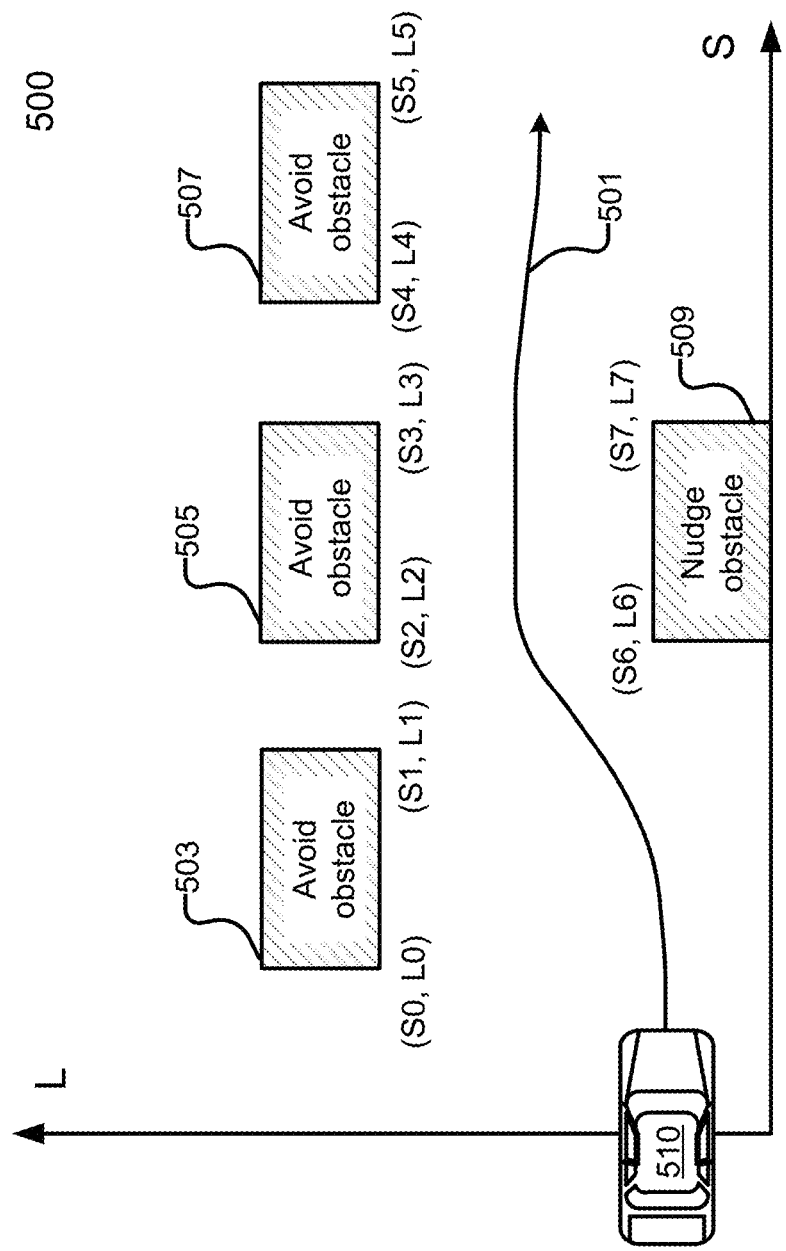
FIG. 5 is a block diagram illustrating an example of a station-lateral (SL) map according to one embodiment.

FIG. 5 is a block diagram illustrating a station-lateral (SL) map according to one embodiment. Referring to FIG. 5, SL map 500 has an S horizontal axis, or station, and an L vertical axis, or lateral. As described above, station-lateral coordinates are a relative geometric coordinate system that references a particular stationary point on a reference line and follows the reference line. For example, a (S, L)=(1, 0) coordinate can denote one meter ahead of a stationary point (i.e., a reference point) on the reference line with zero meter lateral offset. A (S, L)=(2, 1) reference point can denote two meters ahead of the stationary reference point along the reference line and a one-meter perpendicular lateral offset from the reference line, e.g., a left offset.

Referring to FIG. 5, SL map 500 includes reference line 501 and obstacles 503-509 perceived by ADV 510. In one embodiment, obstacles 503-509 may be perceived by a RADAR or LIDAR unit of ADV 510 in a different coordinate system and translated to the SL coordinate system. In another embodiment, obstacles 503-509 may be artificially formed barriers as constraints so the decision and planning modules would not search in the constrained geometric spaces. In this example, a path decision module can generate decisions for each of obstacles 503-509 such as decisions to avoid obstacles 503-508 and nudge (approach very closely) obstacle 509 (i.e., these obstacles may be other cars, buildings and/or structures). A path planning module can then recalculate or optimize reference line 501 based on a path cost in view of obstacles 503-509 using QP programming to fine tune reference line 501 with the minimum overall cost as described above. In this example, the ADV nudges, or approaches very close, for obstacle 509 from the left of obstacle 509.

Figure 6A:
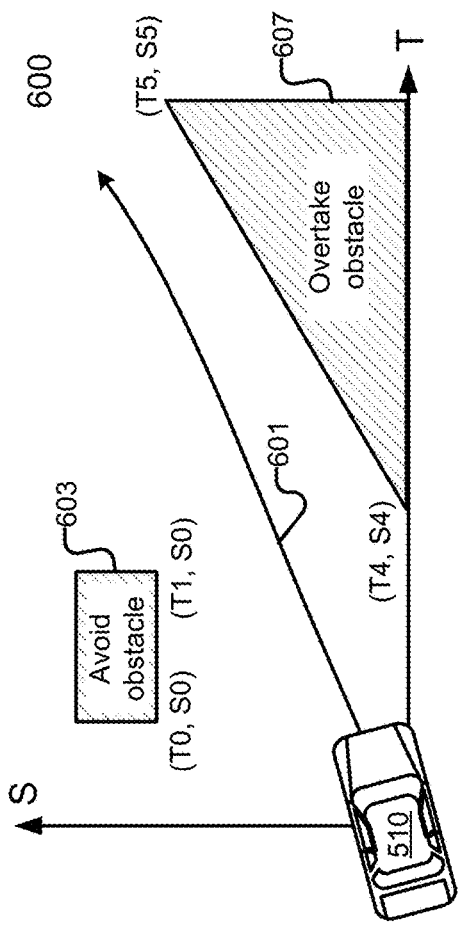
FIGS. 6A-6B are block diagrams illustrating examples of station-time (ST) maps according to one embodiment.
Figure 6B:
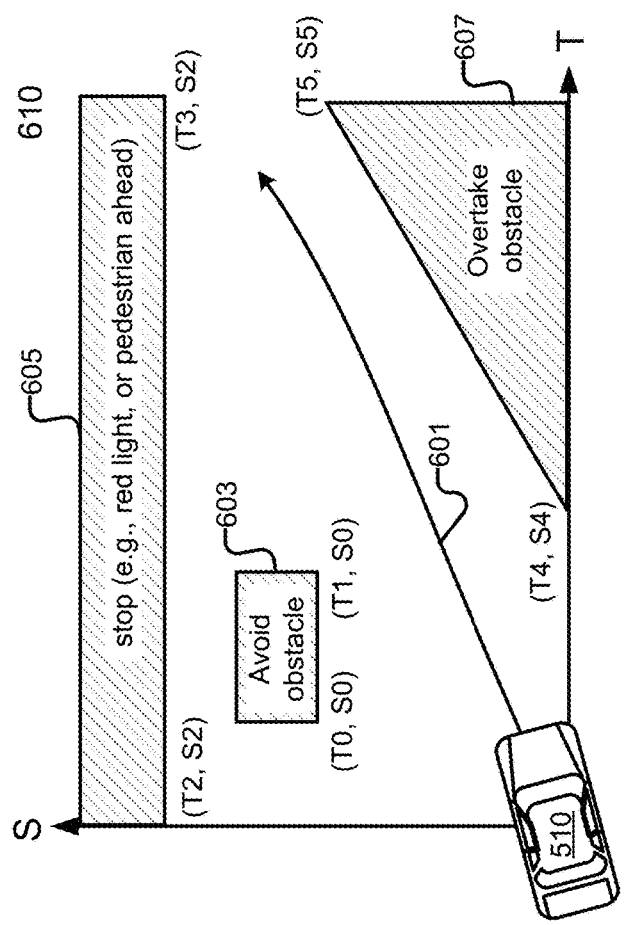

FIGS. 6A and 6B are block diagrams illustrating station-time maps according to some embodiments. Referring to FIG. 6A, ST graph 600 has a station (or S) vertical axis and a time (or T) horizontal axis. ST graph 600 includes curve 601 and obstacles 603-607. As described above, curve 601 on station-time graph indicates, at what time and how far away is the ADV from a station point. For example, a (T, S)=(10000, 150) can denote in 10000 milliseconds, an ADV would be 150 meters from the stationary point (i.e., a reference point). In this example, obstacle 603 may be a building/structure to be avoided and obstacle 607 may be an artificial barrier corresponding to a decision to overtake a moving vehicle.

Referring to FIG. 6B, in this scenario, artificial barrier 605 is added to the ST graph 610 as a constraint. The artificial barrier can be examples of a red light or a pedestrian in the pathway that is at a distance approximately S2 from the station reference point, as perceived by the ADV. Barrier 605 corresponds to a decision to "stop" the ADV until the artificial barrier is removed at a later time (i.e., the traffic light changes from red to green, or a pedestrian is no longer in the pathway).

Figure 7:
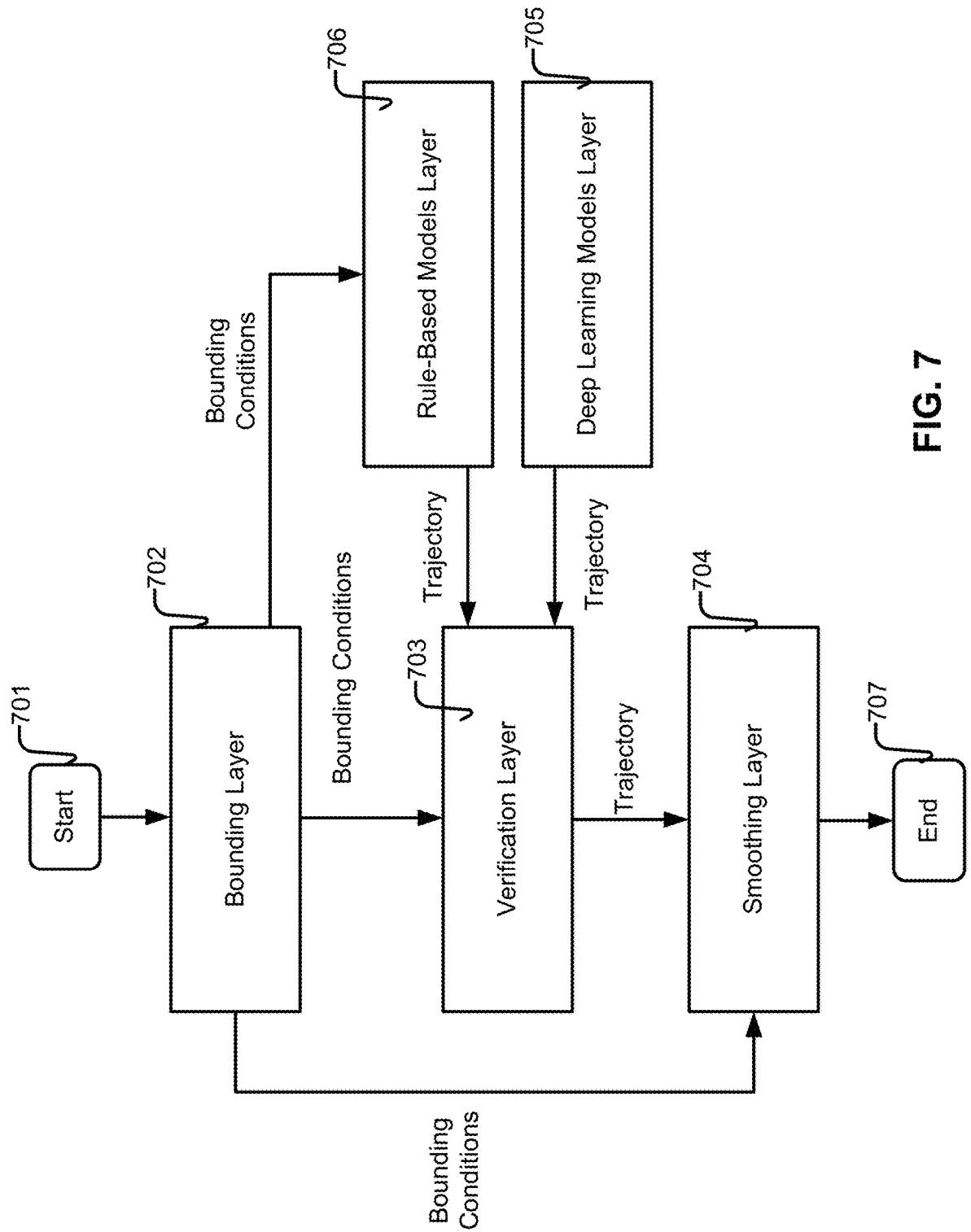
FIG. 7 is a block diagram illustrating an example of hybrid planning framework according to one embodiment.

FIG. 7 is a block diagram illustrating an example of hybrid planning framework according to one embodiment. Referring to FIG. 7, framework 700 includes a start 701, an end 707, and three layers 702-704. The three layers 702-704 includes a bounding layer 702, a verification layer 703, and a smoothing layer 704. The bounding layer 702 can generate (real or artificially formed) path and/or speed bounds (or bounding conditions) for trajectory verification. The path and speed bounds can be generated based on road infrastructure (e.g., lane and road boundary), traffic signals/signs, and vehicle dynamics. A verification layer 703 can verify if a trajectory satisfies the trajectory bounds, e.g., satisfies a safety threshold and a vehicle dynamics threshold. A smoothing layer 704 can smooth a trajectory of layer 703 based on the bounds of layer 702 to generate a smooth trajectory.

Figure 8A:
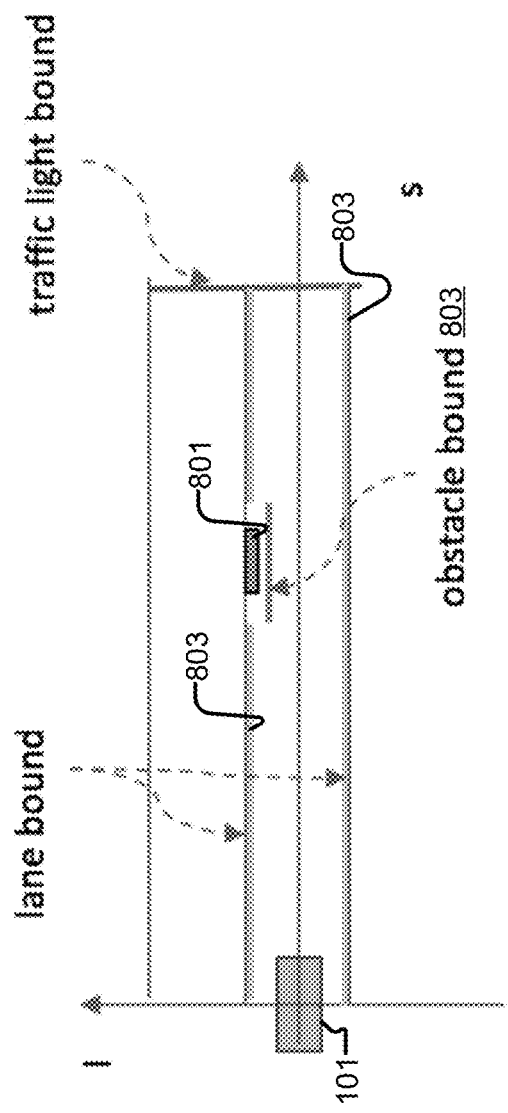
FIGS. 8A-8B are block diagrams illustrating examples of SL maps according to one embodiment.
Figure 8B:
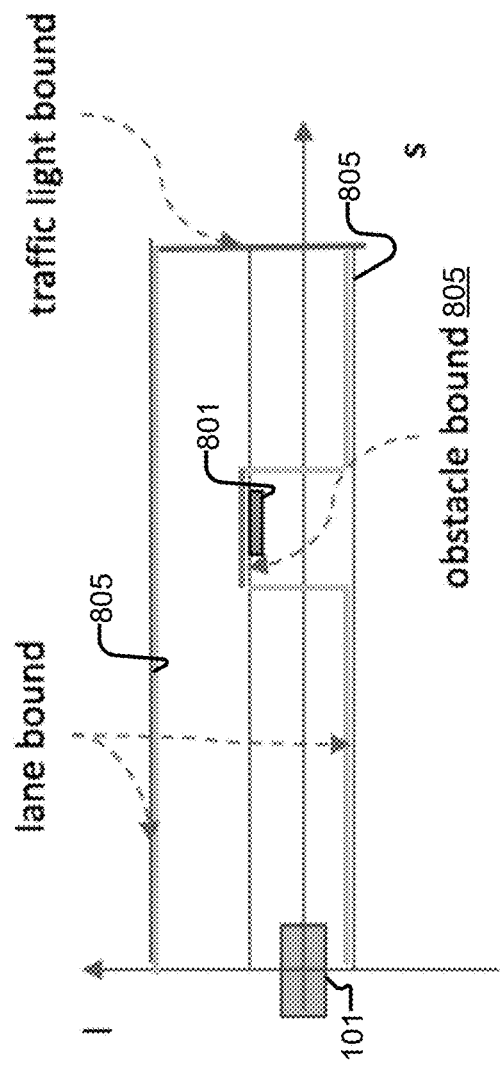

Referring to FIG. 7, the bounding conditions generated by bounding layer 702 is used to ensure a minimum safety/comfort threshold. In one embodiment, bounding layer 702 generates bounds based on path/speed decisions of the ADV. For example, bounds to left nudge based on a path decision and overtake based on a speed decision would be different than bounds to right nudge based on the path decision and to yield based on the speed decision. Referring to FIGS. 8A-8B, the path bounds 803 are generated based on a path decision, traffic light/lane boundaries and positions of obstacles. The path bounds 803 represent boundaries bounding an area which an ADV is safe to drive within. Here, a path decision determines which side to the obstacle 801 (left or right) the ADV 101 plans to pass. For example, FIG. 8A shows bounds 803 indicating that it is safe to pass obstacle 801 from a right (lower) side of obstacle 801. FIG. 8B shows bounds 805 indicating that it is safe to pass obstacle 801 from left (upper) side of obstacle 801.

Figure 9A:
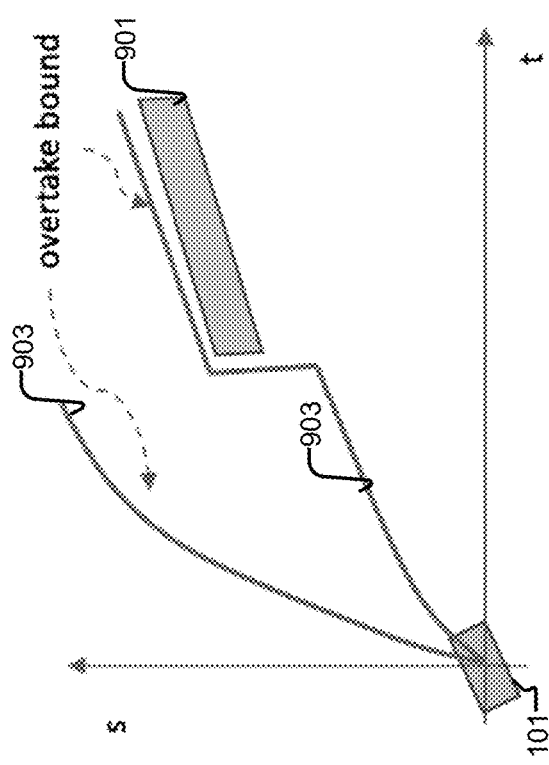
FIGS. 9A-9B are block diagrams illustrating examples of ST maps according to one embodiment.
Figure 9B:
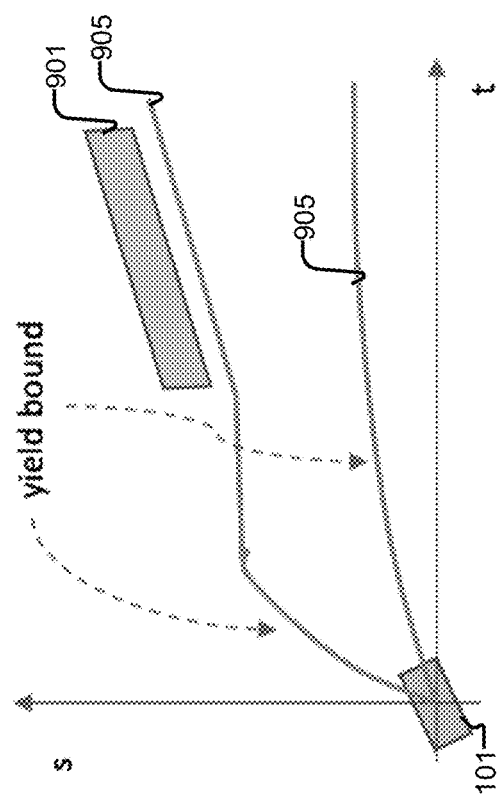

Similar to the path bounds, speed bounds can be generated based on vehicle dynamics, e.g., dynamics of the ADV, and obstacle bounds based on the perceived obstacles. Referring to FIG. 9A, bounds 903 are generated for a trajectory to overtake obstacle 901. Referring to FIG. 9B, bounds 905 are generated for a trajectory to yield obstacle 901. The speed bounds 903-905 provide an area in the ST map where a speed profile of a driving trajectory satisfies the bounds 903. In this case, a driving trajectory with a speed profile situated within the bounds would satisfy the speed bounds 903-905.

Referring to FIG. 7, verification layer 703 can verify whether a trajectory satisfies both the path bounds and the speed bounds, where the path/speed bounds are provided by the bounding layer 702. The verification layer 703 can receive trajectories generated by a deep learning models layer 705 and/or a rule-based models layer 706. If the trajectory generated by the deep learning models layer 705 satisfies both the path and the speed bounds, verification layer 703 outputs a trajectory generated by the deep learning models layer 705. If the trajectory generated by the deep learning models layer 705 fails to satisfy either the path bounds or the speed bounds, verification layer 703 outputs a trajectory from rule-based models layer 706. This hybrid approach ensures that an output trajectory of layer 703 always satisfies both the path and the speed bounds.

Referring to FIG. 7, in one embodiment, a deep learning models layer 705 can include one or more deep learning neural network models trained to generate a trajectory. Verification layer 703 can then receive the trajectory from the deep learning models layer 705 for processing. Examples of neural network models include supervisor/imitation neural network models, reinforcement learning models, recurrent neural network models, convolutional neural network models, or a combination thereof. For example, a vision system of an ADV may include a convolutional neural network model to perceive a surrounding environmental of an ADV including a static environment (e.g., road infrastructure) and/or a dynamic environment (e.g., surrounding vehicles). With inputs of the vehicle dynamics (e.g., the acceleration and/or braking capabilities of the ADV), the perceived environment, map information (e.g., part of map and route data 311 of FIG. 3A), and/or traffic rules (e.g., traffic rules 312 of FIG. 3A), layer 705 generates a driving trajectory using the one or more deep learning neural network models. The bounds however are not used by the deep learning models layer 705 for the trajectory generation. Thus, although the trajectory generated may closely match a driving behavior of a human driver (in the case of an imitation neural network model), however, the trajectory may violate one or more bounding conditions.

Figure 10A:
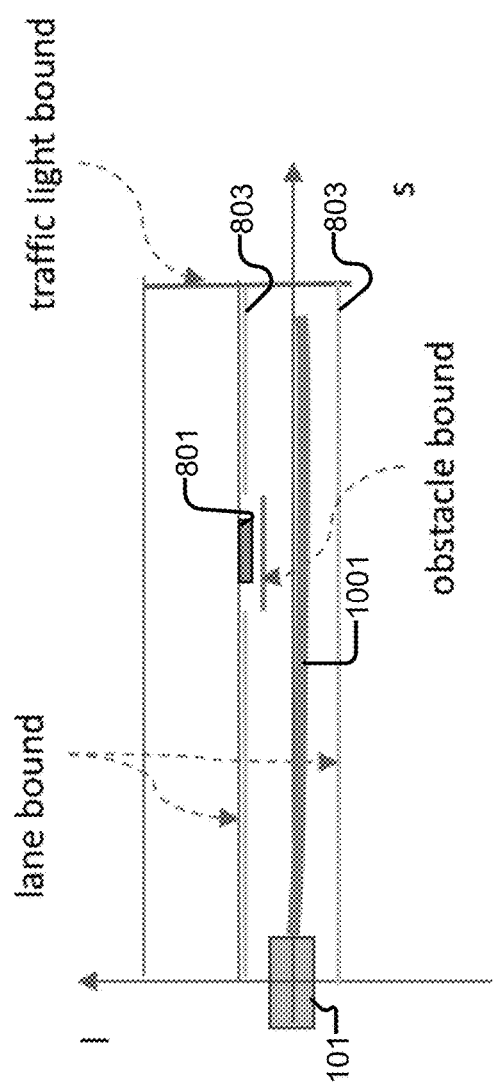
FIGS. 10A-10B are block diagrams illustrating examples of SL maps according to one embodiment.
Figure 10B:
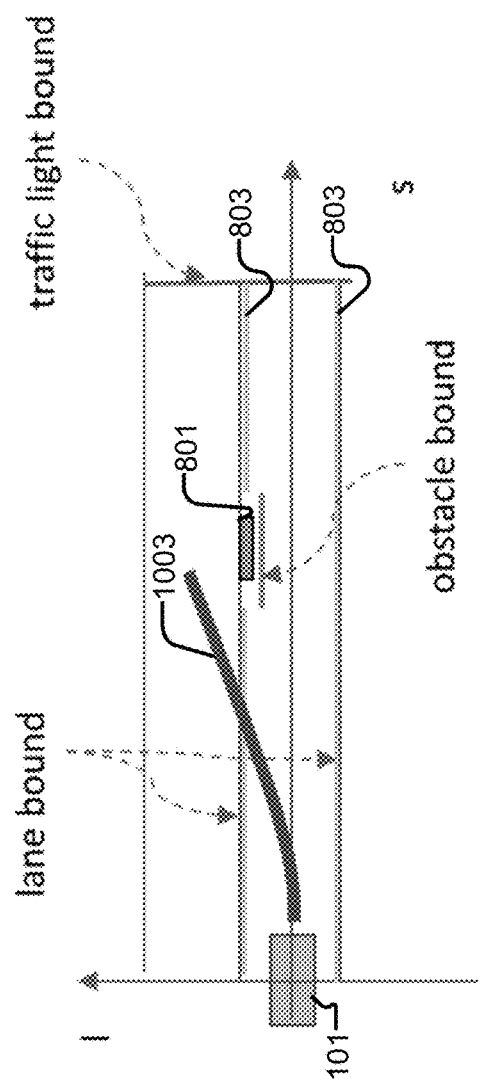
Figure 11A:
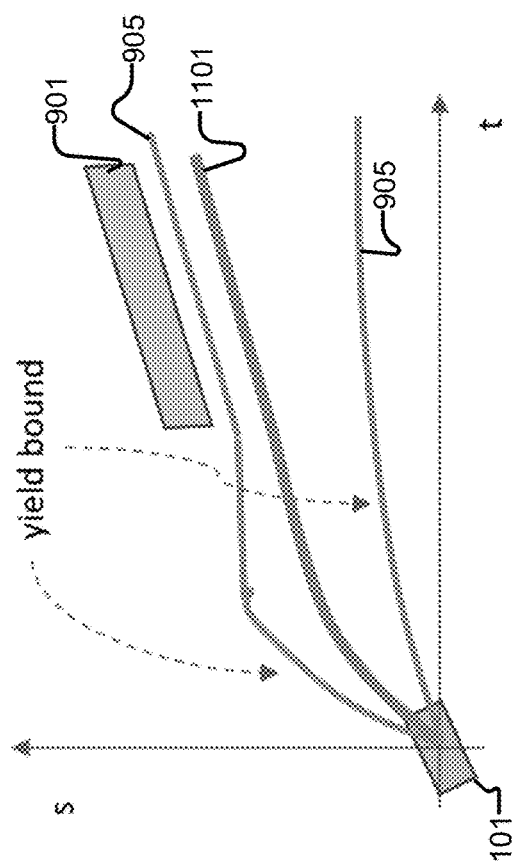
FIGS. 11A-11B are block diagrams illustrating examples of ST maps according to one embodiment.
Figure 11B:
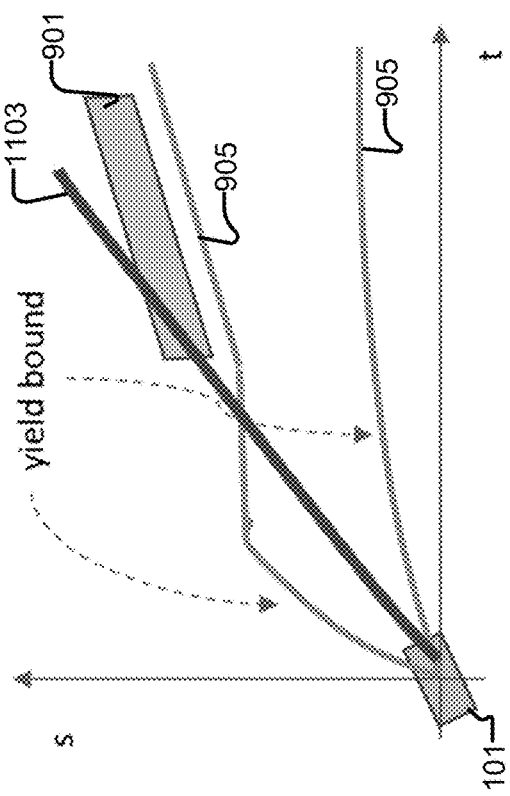

FIGS. 10A-10B are block diagrams illustrating examples of SL maps according to one embodiment. The SL maps of FIGS. 10A-10B may be similar to the SL map of FIG. 8A to pass from a right side of obstacle 801. FIGS. 11A-11B are block diagrams illustrating examples of ST maps according to one embodiment. The ST maps of FIGS. 11A-11B may be similar to the ST map of FIG. 9B to yield obstacle 901. Referring to FIGS. 10A-10B, the verification layer 703 can receive trajectories from deep learning models layer 705 at different planning cycles. FIG. 10A can include a trajectory from one planning cycle while FIG. 10B includes a trajectory from another planning cycle. Here, verification layer 703 can determine that path 1001 is within bounds 803 and path 1003 violates bounds 803, where path 1001 may correspond to a trajectory for one planning cycle and path 1003 may correspond to another trajectory for another planning cycle.

Referring to FIGS. 11A-11B, verification layer 703 can determine speed profile 1101 is within bounds 905 and speed profile 1103 violates bounds 905, where speed profile 1101 corresponds to a trajectory for one planning cycle and speed profile 1103 corresponds to a trajectory for another planning cycle. In one embodiment, for a trajectory that violates the path bounds or the speed bounds in the SL or the ST maps, the trajectory is discard and a trajectory of a rule-based models is output for layer 703.

Referring to FIG. 7, in one embodiment, a rule-based models layer 706 can generate a trajectory and outputs the trajectory to layer 703 for processing. For example, rule-based models layer 706 can receive bound conditions from layer 702 and a reference line derived from map/route information (e.g., map and route data 311 of FIG. 3A). The reference line may be a planned path at the center of a roadway. Based on the bound conditions and the reference line, layer 706 can generate the SL and ST maps (such as the SL and the ST maps of FIGS. 8-9). Layer 706 can then generate a number of trajectory candidates based on enumerated end conditions (e.g., a desired location/speed at the end of the trajectory) that are within the bounds of the generated SL and the ST maps. Layer 706 then generates a cost/reward function that includes one or more weight factors such as safety, comfort, and/or achieving progress (e.g., objective) factors for selection of the trajectory candidates. For example, a trajectory closer to an obstacle incurs a higher cost than a trajectory farther away from the obstacle. A trajectory closer to the reference line incurs a lower cost. Layer 706 then evaluates the trajectory candidates based on the cost/reward function to determine an optimal trajectory, e.g., a trajectory with a minimal cost, as an output trajectory of layer 706.

In one embodiment, a cost function can be: cost total=cost_safety*weight_safety+cost_comfort*weight_comfort+cost_obj*weight_obj, where cost_safety is a safety cost, weight_safety is a weight factor for the safety cost, cost_comfort is a comfort cost, weight comfort is a weight factor for the comfort cost, cost_obj is an objective cost, and weight_obj is a weight factor for the objective cost. Note that although three factors are shown, the cost function can include any number of factors. Further, the different weight factors can be numerical values to adjust for an importance of each of the costs relative to the rest of the costs. Once the total costs are computed for each of the trajectory candidates, a best trajectory candidate can be selected based on a lowest total cost among the trajectory candidates.

Referring to FIG. 7, in one embodiment, the smoothing layer 704 can smooth an output trajectory of layer 703 based on a smoothing function to generate a final trajectory. In one embodiment, smoothing layer 704 may be integrated with verification layer 703.

In one embodiment, the smoothing function is a B-spline or a regression function. In one embodiment, the smoothing function includes an optimization function. In one embodiment, the smoothing function can be solved iterative by an optimization algorithm, e.g., dynamic programming (DP) or quadratic programming (QP) algorithm, or any other types of optimization algorithms.

For example, a trajectory may be represented by a number of segments or piecewise polynomials in the SL map and/or ST map. In one embodiment, the piecewise polynomial in the SL map may be:

$$l(s)=a_i+b_i\times s+c_i\times s^2+d_i\times s^3+e_i\times s^4+f_i\times s^5 (0\le s\le s_i)$$

where (s, l) are station and lateral coordinates, $a_i, \ldots, f_i$ are coefficients for a fifth order piecewise polynomial and i=0 . . . n, for n piecewise polynomials representing a spline. Note, the piecewise polynomials can be any degree of polynomials depending on route or road conditions.

In one embodiment, a smoothing function may include smoothness costs kernels. An example objective/cost function having the three smoothing kernels can be as follow:

$$\text{path cost} = \sum_{i=1}^{n}\left(w_1\int_0^{s_i}(l'_i(s))^2 ds + w_2\int_0^{s_i}(l''_i(s))^2 ds + w_3\int_0^{s_i}(l'''_i(s))^2 ds\right)$$

with the kernels in the ordering of a first derivative smoothness, a second derivative smoothness, a third derivative smoothness, where (s, l) are station and lateral coordinates, $w_1 \ldots w_3$ are weight factors for smoothness costs, $l_i(s)$ is the ith piecewise polynomial. Here, the smoothness costs ensure the piecewise polynomials are smoothed to the third derivative.

Figure 12:
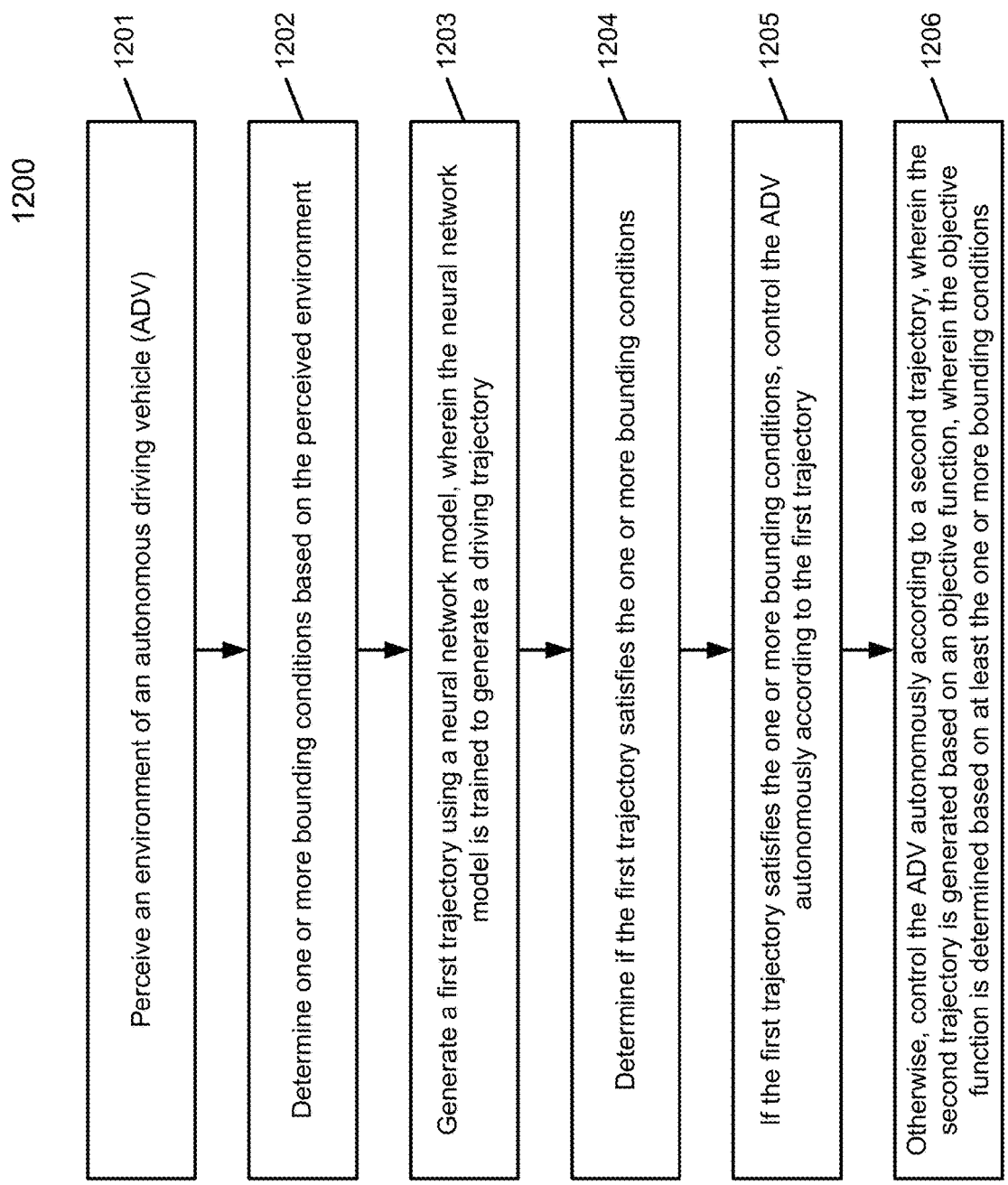
FIG. 12 is a flow diagram of a method performed by an ADV according to one embodiment.

FIG. 12 is a flow diagram illustrating a method performed by an ADV according to one embodiment. Processing 1200 may be performed by processing logic which may include software, hardware, or a combination thereof. For example, process 1200 may be performed by hybrid planning module 308 of FIG. 3A. Referring to FIG. 12, at block 1201, processing logic perceives an environment of an autonomous driving vehicle (ADV). At block 1202, processing logic determines one or more bounding conditions based on the perceived environment, map information, and/or traffic rules. The map information can specify a lane of the ADV, and the left and right lane boundaries, a direction of traffic for the lane, and whether a lane change is allowed according to traffic rules (e.g., dotted lane makers or a solid lane line). The map information may be a high definition map (e.g., as part of map and route data 311 of FIG. 3A) of the ADV, or may be a map generated in real-time as perceived from sensors of the ADV. For example, if the lane does not allow a lane change (e.g., solid lane lines), the bounding conditions can then include path bounds based on the left and the right lane lines. If the lane allows a lane change, the bounding conditions can include path bounds for the left and the right side of a roadway. At block 1203, processing logic generates a first trajectory using a neural network model, wherein the neural network model is trained to generate a driving trajectory. At block 1204, processing logic determines if the first trajectory satisfies the one or more bounding conditions. At block 1205, if the first trajectory satisfies the one or more bounding conditions, processing logic controls the ADV autonomously according to the first trajectory. At block 1206, otherwise, processing logic controls the ADV autonomously according to a second trajectory, where the second trajectory is generated based on an objective function and the objective function is determined based on at least the one or more bounding conditions.

In one embodiment, the second trajectory is generated based on at least an objective function including generating a path profile based on traffic rules and the one or more obstacles perceived by the ADV, generating a speed profile based on the path profile, wherein the speed profile includes, for each of the one or more obstacles, a decision to yield or overtake the obstacle, and generating the second trajectory based on the path profile, the speed profile, and the objective function using dynamic programming such that the ADV can be controlled autonomously based on the second trajectory.

In one embodiment, processing logic further smooths the first or the second trajectory based on a smoothing function, wherein the smoothing function is determined based on the one or more bounding conditions. In one embodiment, the one or more bounding conditions includes a lane bound, an obstacle bound, or a traffic light bound.

In one embodiment, the first trajectory is generated using the neural network model based on a capability of the ADV and the perceived environment of the ADV. In one embodiment, processing logic further determines the one or more bounding conditions based on map information and the map information is retrieved from a local or a remote database of the ADV.

In one embodiment, the second trajectory is generated based on at least an objective function includes: generating a number of trajectory candidates, determining a trajectory cost based on the objective function for each of the trajectory candidates, the objective function having a safety factor, a comfort factor, and/or a progress factor, and selecting one of the trajectory candidates as the second trajectory, where the selected trajectory has a lowest trajectory cost.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to generate a driving trajectory for an autonomous driving vehicle (ADV), the method comprising:
   determining one or more bounding conditions based on a perceived environment of an ADV, wherein the one or more bounding conditions include a path bound and a speed bound;
   generating a first trajectory with a deep learning models layer, the first trajectory generated using a neural network model trained to generate a driving trajectory;
   generating a second trajectory with a rules-based models layer, the second trajectory generated based on an objective function and the one or more bounding conditions such that the second trajectory satisfies the one or more bounding conditions;
   determining if the first trajectory satisfies the one or more bounding conditions;
   if the first trajectory satisfies the one or more bounding conditions, controlling the ADV autonomously according to the first trajectory; and
   otherwise, controlling the ADV autonomously according to the second trajectory.

2. The method of claim 1, wherein generating the second trajectory based on at least an objective function comprises:
   generating a path profile based on traffic rules and one or more obstacles perceived by the ADV;

generating a speed profile based on the path profile, wherein the speed profile includes, for each of the one or more obstacles, a decision to yield or overtake the obstacle; and generating the second trajectory based on the path profile, the speed profile, and the objective function using dynamic programming such that the ADV can be controlled autonomously based on the second trajectory.

3. The method of claim 1, further comprising smoothing the first or the second trajectory based on a smoothing function, wherein the smoothing function is determined based on the one or more bounding conditions.

4. The method of claim 1, wherein the one or more bounding conditions includes a lane bound, an obstacle bound, or a traffic light bound.

5. The method of claim 1, wherein the first trajectory is generated using the neural network model based on a capability of the ADV and the perceived environment of the ADV.

6. The method of claim 1, further comprising determining the one or more bounding conditions based on map information, wherein the map information is retrieved from a local or a remote database of the ADV.

7. The method of claim 1, wherein generating the second trajectory based on at least an objective function comprises:
generating a plurality of trajectory candidates;
determining a trajectory cost based on the objective function for each of the plurality of trajectory candidates, the objective function having a safety factor, a comfort factor, and/or a progress factor; and
selecting one of the plurality of trajectory candidates as the second trajectory, wherein the trajectory selected as the second trajectory has a lowest trajectory cost.

8. A non-transitory machine-readable medium having instructions stored therein, which when executed by a processor, cause the processor to perform operations, the operations comprising:
determining one or more bounding conditions based on a perceived environment of an autonomous driving vehicle (ADV), wherein the one or more bounding conditions include a path bound and a speed bound;
generating a first trajectory with a deep learning models layer, the first trajectory generated using a neural network model trained to generate a driving trajectory;
generating a second trajectory with a rules-based models layer, the second trajectory generated based on an objective function and the one or more bounding conditions such that the second trajectory satisfies the one or more bounding conditions;
determining if the first trajectory satisfies the one or more bounding conditions;
if the first trajectory satisfies the one or more bounding conditions, controlling the ADV autonomously according to the first trajectory; and
otherwise, controlling the ADV autonomously according to the second trajectory.

9. The non-transitory machine-readable medium of claim 8, wherein generating the second trajectory based on at least an objective function comprises:
generating a path profile based on traffic rules and one or more obstacles perceived by the ADV;
generating a speed profile based on the path profile, wherein the speed profile includes, for each of the one or more obstacles, a decision to yield or overtake the obstacle; and
generating the second trajectory based on the path profile, the speed profile, and the objective function using dynamic programming such that the ADV can be controlled autonomously based on the second trajectory.

10. The non-transitory machine-readable medium of claim 8, wherein the operations further comprise smoothing the first or the second trajectory based on a smoothing function, wherein the smoothing function is determined based on the one or more bounding conditions.

11. The non-transitory machine-readable medium of claim 8, wherein the one or more bounding conditions includes a lane bound, an obstacle bound, or a traffic light bound.

12. The non-transitory machine-readable medium of claim 8, wherein the first trajectory is generated using the neural network model based on a capability of the ADV and the perceived environment of the ADV.

13. The non-transitory machine-readable medium of claim 8, wherein the operations further comprise determining the one or more bounding conditions based on map information, wherein the map information is retrieved from a local or a remote database of the ADV.

14. The non-transitory machine-readable medium of claim 8, wherein generating the second trajectory based on at least an objective function comprises:
generating a plurality of trajectory candidates;
determining a trajectory cost based on the objective function for each of the plurality of trajectory candidates, the objective function having a safety factor, a comfort factor, and/or a progress factor; and
selecting one of the plurality of trajectory candidates as the second trajectory, wherein the trajectory selected as the second trajectory has a lowest trajectory cost.

15. A data processing system, comprising:
a processor; and
a memory coupled to the processor to store instructions, which when executed by the processor, cause the processor to perform operations, the operations including:
determining one or more bounding conditions based on a perceived environment of an autonomous driving vehicle (ADV), wherein the one or more bounding conditions include a path bound and a speed bound;
generating a first trajectory with a deep learning models layer, the first trajectory generated using a neural network model trained to generate a driving trajectory;
generating a second trajectory with a rules-based models layer, the second trajectory generated based on an objective function and the one or more bounding conditions such that the second trajectory satisfies the one or more bounding conditions;
determining if the first trajectory satisfies the one or more bounding conditions;
if the first trajectory satisfies the one or more bounding conditions, controlling the ADV autonomously according to the first trajectory; and
otherwise, controlling the ADV autonomously according to the second trajectory.

16. The system of claim 15, wherein generating the second trajectory based on at least an objective function comprises:
- generating a path profile based on traffic rules and one or more obstacles perceived by the ADV;
- generating a speed profile based on the path profile, wherein the speed profile includes, for each of the one or more obstacles, a decision to yield or overtake the obstacle; and
- generating the second trajectory based on the path profile, the speed profile, and the objective function using dynamic programming such that the ADV can be controlled autonomously based on the second trajectory.

17. The system of claim 15, wherein the operations further comprise smoothing the first or the second trajectory based on a smoothing function, wherein the smoothing function is determined based on the one or more bounding conditions.

18. The system of claim 15, wherein the one or more bounding conditions includes a lane bound, an obstacle bound, or a traffic light bound.

19. The system of claim 15, wherein the first trajectory is generated using the neural network model based on a capability of the ADV and the perceived environment of the ADV.

20. The system of claim 15, wherein the operations further comprise determining the one or more bounding conditions based on map information, wherein the map information is retrieved from a local or a remote database of the ADV.

21. The system of claim 15, wherein generating the second trajectory based on at least an objective function comprises:
- generating a plurality of trajectory candidates;
- determining a trajectory cost based on the objective function for each of the plurality of trajectory candidates, the objective function having a safety factor, a comfort factor, and/or a progress factor; and
- selecting one of the plurality of trajectory candidates as the second trajectory, wherein the trajectory selected as the second trajectory has a lowest trajectory cost.

* * * * *